United States Patent [19]

Hayashida

[11] 4,030,758
[45] June 21, 1977

[54] DUAL SYSTEM HYDRAULIC BRAKING APPARATUS FOR VEHICLE

[75] Inventor: Yoshihiro Hayashida, Chigasaki, Japan

[73] Assignee: Tokico Ltd., Japan

[22] Filed: Mar. 24, 1976

[21] Appl. No.: 669,876

Related U.S. Application Data

[63] Continuation of Ser. No. 456,660, April 1, 1974, abandoned.

[52] U.S. Cl. .............................. 303/84 A; 60/416
[51] Int. Cl.[2] ...................................... B60T 15/46
[58] Field of Search ............... 188/345, 106 P, 358, 188/355, 349, 151 A; 303/6 R, 6 C, 84 R, 84 A; 137/118; 60/404, 416; 91/6

[56] References Cited

UNITED STATES PATENTS 3,382,333  5/1968  Ihnacik, Jr. ................. 303/84 A X
3,759,288  9/1973  Kobashi ..................... 303/84 A X

FOREIGN PATENTS OR APPLICATIONS 1,233,846  6/1971  United Kingdom ............. 303/84 A

*Primary Examiner*—George E. A. Halvosa
*Attorney, Agent, or Firm*—James E. Nilles

[57] ABSTRACT

Dual system hydraulic braking apparatus for a vehicle comprising a piston slidable in a cylinder, the opposite ends of the piston being adapted to engage with either of two valve seats disposed on the opposite ends of the cylinder to stop fluid flow therethrough when the piston moves, the valve seats being connected respectively to two separate braking circuits, each chamber defined between each end of the cylinder and the adjacent end of the piston being connected to a hydraulic pump through respective check valve, the piston being biased to the central position by springs disposed in the chambers.

3 Claims, 2 Drawing Figures

DUAL SYSTEM HYDRAULIC BRAKING APPARATUS FOR VEHICLE

REFERENCE TO RELATED CO-PENDING APPLICATION

This is a continuation of U.S. Ser. No. 456,660, filed on Apr. 1, 1974 and now abandoned.

BACKGROUND OF THE INVENTION

This invention relates to improvement in a dual system hydraulic brake device for use in vehicles.

With a hydraulic brake device for use in vehicles, it is a common practice to use a dual system type brake device to cope with loss of braking function in the event of troubles such as due to oil leakage in either of the brake systems.

For clarifying the disadvantages of the prior art dual system hydraulic brake device, we wish to refer to FIG. 1 which shows a schematic view of a conventional dual system hydraulic brake device. An outlet of a pump 1 producing a hydraulic pressure is connected by way of a pipe 2 to inlets of two check valves 3 and 4. The pipe 2 is also connected to an inlet of a relief valve 5, the outlet of which is connected by way of pipe 6 to a reservoir 7. The outlets of the check valves 3 and 4 are connected by way of pipes 8 and 9 to respective inlets of a dual system control valve 10 as well as connected by way of branched pipes 11 and 12 to hydraulic accumulators 13 and 14. The respective outlets of the control valve 10 are connected by way of pipes 15 and 16 to a brake circuit 17 for system I and to a brake circuit 18 for system II, respectively. Shown at 19 is a brake pedal which is adapted to force pistons 21 and 22 into the control valve 10 by way of a push rod 20. The outlets for return oil, of the control valve 10 is connected to the reservoir 7 by way of pipes 23 and 24 and a pipe 25 which is commonly connected to pipes 23 and 24 as well as to the inlet of the pump 1. With a conventional system of such an arrangement, when a driver treads down the brake pedal 19, the push rod 20 will force pistons 21 and 22 such that the hydraulic pressure, which is being supplied from the pump 1 or from the accumulators 13 and 14 to the control valve 10, is applied to the brake circuit 17 for the system I and the brake circuit 18 for the system II simultaneously, thereby effecting a braking operation.

In the event of failure in either of the systems, for example, system I, such as due to oil leakage, hydraulic pressure of the pump 1 can not be utilized in system II, since the check valve 3 will be opened at a relatively low pressure. As a result, braking operation in the system II will be achieved only by means of hydraulic fluid stored in the accumulator 14. While, an accumulator equipped on an automobile is usually capable of 10 to 20 times braking operations without receiving hydraulic fluid from a pump. Accordingly, in the event of failure in one of the systems, the other system will soon become inoperable.

One of the solutions to avoid this shortcoming is to provide two systems including pumps, which are entirely independent of each other. However, this necessarily leads to a complicated construction, with the increase in number of parts and cost, in addition to added power loss caused due to the use of two pumps, thus failing to meet desired practical use.

SUMMARY OF THE INVENTION

The present invention is directed to providing a dual system type hydraulic brake control device for use in a vehicle, wherein a single pump serving as a source of hydraulic pressure is provided in common for two systems, by resorting to the provision of a single valve means, and which would not exert influence on one system, even if the other system is in failure.

According to the present invention there are provided a dual system hydraulic apparatus for use in a vehicle comprising a valve body having a cylinder bore for receiving slidably a piston therein, plugs for closing the opposite ends of the cylinder bore, an axial bore formed in each of said plugs the outer end of which is connected with each of the dual braking systems and the inner end of which defines a valve seat for cooperating with adjacent end of the piston, a chamber defined in the valve body between the inner end of each of the plugs and the adjacent end of the piston, a radial passage formed in the valve body for connecting each of the chambers with a hydraulic accumulator, two ball check valves disposed in the valve body, the inlets of which are connected commonly to a single hydraulic pump and respective outlets of which are communicated with said chambers respectively, and a failure alarming device being adapted to be actuated when the piston is moved from the neutral position.

Thus, even in failure of one of the braking circuit, the pump can supply fluid under pressure to the other braking circuit.

These and other objects and features of the present invention will be apparent from a reading of the ensuing part of the specification in conjunction with FIG. 2 which indicates one embodiment of the invention.

DETAILED DESCRIPTION OF THE EMBODIMENT

Figure 1:
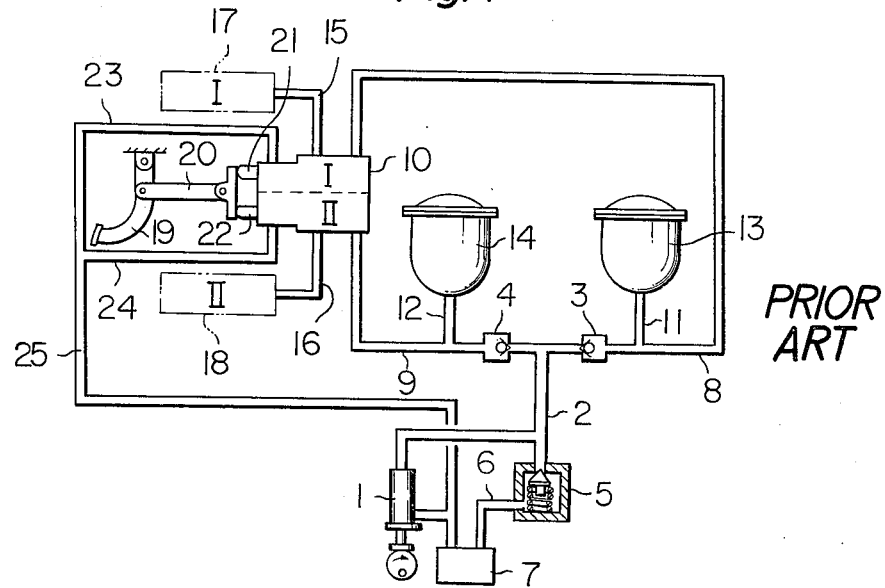
FIG. 1 is a schematic view showing a dual system hydraulic brake device according to the prior art.
Figure 2:
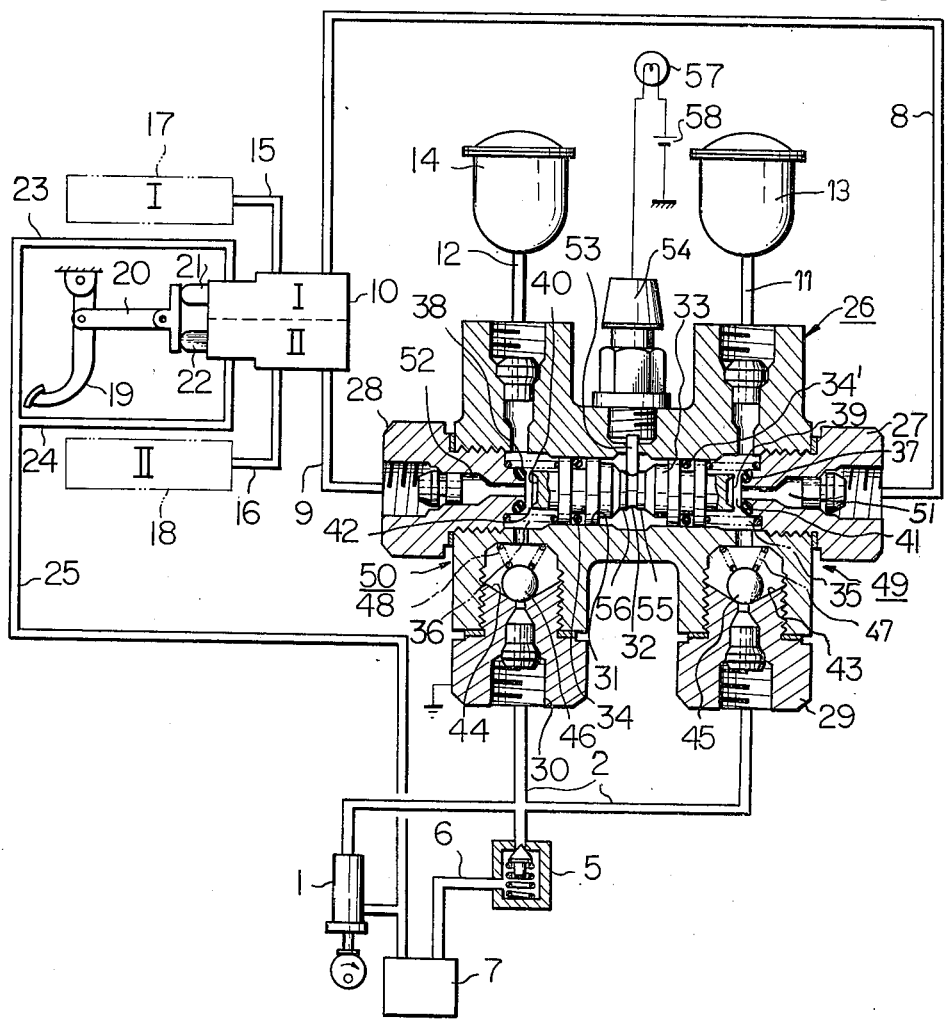
FIG. 2 is a schematic view of a dual system hydraulic brake device exemplifying the present invention.

FIG. 2 shows a preferred embodiment of the present invention, general arrangement of the entire system is similar to that of FIG. 1 and the parts corresponding to those of FIG. 1 are designated by same reference numerals and, therefore, detailed description is omitted.

Shown at 26 is a valve body, in which are fitted plugs 27 and 28 communicating through passages 51 and 52 with chambers 41 and 42 which are defined between the opposite ends of a cylinder bore 31 and the adjacent ends of a piston 33. The plugs 27 and 28 are connected to the inlets of the control valve 10, respectively, by way of pipes 8 and 9. In addition, fitted in the valve body 26 are plugs 29 and 30 which are connected in common to the outlet of a pump 1 by way of a pipe 2.

Defined within the valve body 26 is the cylinder bore 31 whose opposite ends are closed with the aforesaid plugs 27 and 28, while there is piston 33 having a small-diameter central portion 32 and stepped or inclined annular portions provided symmetrically and outwardly from the central portion, and being slidably fitted in the cylinder bore 31. Shown at 34 and 34' are seals for maintaining oil-tightness. Springs 35 and 36 having the equal strength are provided between the opposite ends of piston 33 and the plugs 27 and 28, respectively, thereby biasing the piston 33 towards the central or neutral position as shown in the drawing. Defined on the opposite ends of the piston 33 are recessed portions 39 and 40 adapted to engage with valve seats 37 and 38 provided in plugs 27 and 28 for stopping oil flow therethrough. Communicating with the chambers 41 and 42 defined between the opposite ends of the piston 33 and the plugs 27, 28 are the outlets of check valves 49 and 50 which are located between the plugs 29, 30 and the valve body 26. The check valves comprise valve seats 43 and 44, balls 45 and 46 and springs 47 and 48.

The hydraulic accumulator 13 is connected by way of a pipe 11 to the chamber 41, and the other accumulator 14 is in communication with the chamber 42 by way of a pipe 12.

Mounted on the central portion of the valve body 26 is a switch 54 having a plunger 53, with the tip of the plunger 53 abutting the small diameter portion 32 of the piston 33 in normal inoperative condition. Provided on the opposite sides of the small diameter portion 32 of the piston 33 are stepped and/or inclined annular portions 55 and 56 having diameters slightly larger than that of the portion 32, whereby the plunger 53 will be moved upwardly when the piston 33 is moved to the left or to the right from the neutral position shown in the drawing. At that time, the electric switch 54 is so designed as to close an electric circuit and to illuminate a lamp 57. Shown at 58 is a battery serving as an electric power source.

In operation, when a driver depresses the brake pedal 19, pistons 21 and 22 of control valve 10 will be urged by means of a push rod 20, and then oil in amounts corresponding to the force acting on the brake pedal 19 will be supplied from the hydraulic pump 1 through check valves 49 and 50 to the braking circuit 17 of the system I as well as to the braking circuit 18 of the system II, simultaneously. In this case, oil from the pump 1 passes through the chambers 41 and 42, and the piston 33 will move neither to the right nor to the left, since the effective areas of the opposite ends of the piston 33 are the same and so are the strength of the springs 35 and 36.

Here now, suppose that one of the systems is in trouble, for example, oil leakage takes place in the system I, then the hydraulic pressure in the system I will decrease, such that the pressure in pipes 15, 8 and the chamber 41 will be lowered, whereby the piston 33 will move to the right according to the differential pressure and then the recessed portion 39 in the right end thereof will engage with the valve seat 37. This blocks the pump 1 against the communication with the circuit 17 of the system I. Thus, the pressurized oil from the pump 1 will solely be supplied to the braking circuit 18 of the system II, and thus the braking action of the system II will be maintained as before. The accumulators 13 and 14 are connected to the chambers 41 and 42 which are on the downstream side of the valve seats 37 and 38. Thereby, hydraulic fluid stored in the accumulator 13 will not be exhausted entirely in the failure of the system I, and hydraulic pressure in the chamber 41 will soon be restored by the hydraulic pump 1, but the effective area of the rightside of the piston 33 is reduced by the cross-sectional area of the valve seat 37, thus the piston 33 is maintained in its valve closing position.

As is apparent from the foregoing description, according to the present invention, a single pump is used to operate the whole system and thus a safe braking device of a simple construction and of least power loss may be obtained. In addition, the braking device according to the present invention is compact in size and low in cost, yet presenting functions similar to those of the two independent systems.

In addition, the provision of alarming circuits 57 and 58 may notify the driver of troubles such as when the piston 33 is moved due to the trouble in the brake system, thus presenting improved safety. It should be understood that the lamp 57 is presented as one example, and thus other alarming means such as acoustic means may be used alternatively or simultaneously.

I claim:

1. In a dual hydraulic braking system for use in a vehicle:
    a pair of braking systems;
    a pair of hydraulic accumulators, one for each system;
    a hydraulic pump for supplying hydraulic fluid to said systems;
    and valve means comprising:
    a valve body having a cylinder bore;
    means for closing the opposite ends of said bore;
    a piston slideably mounted in said bore and cooperating with said bore to define a pair of chambers, each chamber being located between a closed end of the bore and an adjacent end of said piston;
    means for biasing said piston to a central position in said bore;
    a pair of first passages, each first passage communicating between said hydraulic pump and one of said chambers;
    a pair of check valves disposed in said valve body, each check valve being located in one of said first passages to prevent hydraulic fluid flow from a chamber to said hydraulic pump;
    a pair of second passages, each second passage communicating between one of said chambers and one of said hydraulic accumulators;
    a pair of third passages including a port located in the means for closing an end of said cylinder bore, each said port being surrounded by a valve seat, each third passage communicating between one of said chambers and one of said braking systems;
    and means on the opposite ends of said piston to close the third passage adjacent an end of said piston to prevent fluid flow therethrough when said piston is moved in either direction from its central position, each of said accumulators being connected to one of said third passages downstream of said valve seats through a respective transverse passage formed integrally in said valve body, and the means on a respective end of said piston engaging one of said valve seats to effect closure of a third passage.

2. A dual system hydraulic braking apparatus according to claim 1, in which movement of said piston into engagement with either one of said valve seats functions to close electric contacts in an electric indicator circuit.

3. A dual system hydraulic braking apparatus according to claim 2, in which said piston is formed to have a reduced diameter central portion and a pair of stepped portions formed on both sides of said central portion, and a plunger which normally engages with said central portion is adapted to actuate said electric contacts when the piston is moved in either one direction.

* * * * *